US010645073B1

United States Patent
Agarmore et al.

(10) Patent No.: US 10,645,073 B1
(45) Date of Patent: May 5, 2020

(54) SYSTEMS AND METHODS FOR AUTHENTICATING APPLICATIONS INSTALLED ON COMPUTING DEVICES

(71) Applicant: CA, INC., San Jose, CA (US)

(72) Inventors: Prasad Agarmore, Wagholi (IN); Karan Khanna, Ghorpadi (IN)

(73) Assignee: CA, Inc., San Jose, CA (US)

( * ) Notice: Subject to any disclaimer, the term of this patent is extended or adjusted under 35 U.S.C. 154(b) by 318 days.

(21) Appl. No.: 15/619,571

(22) Filed: Jun. 12, 2017

(51) Int. Cl.
| H04L 29/06 | (2006.01) |
| G06F 21/30 | (2013.01) |
| G06F 21/51 | (2013.01) |
| G06F 21/62 | (2013.01) |
| H04L 9/32  | (2006.01) |
| H04W 12/06 | (2009.01) |

(52) U.S. Cl.
CPC .......... H04L 63/0807 (2013.01); G06F 21/30 (2013.01); G06F 21/51 (2013.01); G06F 21/6281 (2013.01); H04L 9/3213 (2013.01); H04L 63/0815 (2013.01); H04W 12/06 (2013.01)

(58) Field of Classification Search
CPC ............. H04L 63/0807; H04L 63/0815; H04L 9/3213; G06F 21/30; G06F 21/51; G06F 21/6281; H04W 12/06
See application file for complete search history.

(56) References Cited

U.S. PATENT DOCUMENTS

| 8,473,749 | B1* | 6/2013 | Madsen ............... H04L 67/34 713/187 |
| 9,116,768 | B1* | 8/2015 | Sawhney ............... G06F 8/60 |
| 9,615,222 | B2* | 4/2017 | Wen ............... H04L 63/0807 |
| 2005/0132083 | A1* | 6/2005 | Raciborski ............ G06F 21/10 709/232 |
| 2010/0169395 | A1* | 7/2010 | Bryant-Rich ......... G06F 3/0605 707/831 |
| 2013/0332886 | A1* | 12/2013 | Cranfill ............... G06F 3/0482 715/835 |
| 2014/0298420 | A1* | 10/2014 | Barton ................. H04L 63/10 726/4 |
| 2014/0315518 | A1* | 10/2014 | Engelhart ............ H04W 12/06 455/411 |

(Continued)

OTHER PUBLICATIONS

Base64; https://en.wikipedia.org/wiki/Base64; Apr. 13, 2004.

*Primary Examiner* — Kambiz Zand
*Assistant Examiner* — Alexander R Lapian
(74) *Attorney, Agent, or Firm* — FisherBroyles, LLP

(57) ABSTRACT

The disclosed computer-implemented method for authenticating applications installed on computing devices may include (i) requesting to download, onto an endpoint device, an application from a host server, (ii) receiving the application from the host server after the host server has (a) generated an authentication token to be used to authenticate the application on the endpoint device and (b) embedded the authentication token within a filename of the application, (iii) installing the application onto the endpoint device, (iv) identifying the authentication token within the filename of the application, and (v) using the authentication token to authenticate the endpoint device to the application such that a user of the endpoint device is provided access to the application. Various other methods, systems, and computer-readable media are also disclosed.

20 Claims, 7 Drawing Sheets

(56) References Cited

U.S. PATENT DOCUMENTS

2015/0365399 A1* 12/2015 Biswas .................... G06F 9/00
                                                        726/8
2016/0019383 A1*  1/2016 Hanley .................. G06F 21/62
                                                        726/22

* cited by examiner

SYSTEMS AND METHODS FOR AUTHENTICATING APPLICATIONS INSTALLED ON COMPUTING DEVICES

BACKGROUND

Organizations and enterprises may often disseminate new software applications to large numbers of individuals or endpoint devices. For example, a business may request that all or a portion of its employees download an application that will facilitate their work or improve the security of their devices. To ensure that data handled by an application within an organization is properly managed and secured (e.g., not accessed by unauthorized or external entities), the organization may require that users authenticate themselves or their endpoint devices to the application. Traditional methods for registering or enrolling a user with an application may involve prompting the user to manually provide authentication credentials when installing and setting up the application.

Unfortunately, these conventional methods may be tedious and/or cumbersome for many users. For example, applications that handle sensitive data may require users to generate and enter long, complicated passwords. Some organizations may attempt to streamline the process of authenticating users or endpoint devices by inserting authentication credentials (e.g., tokens) into applications before distributing the applications to the users. However, this solution may be impractical or unfeasible for many applications, as encrypted or signed application packages may not be easily modified. The instant disclosure, therefore, identifies and addresses a need for systems and methods for authenticating applications installed on computing devices.

SUMMARY

As will be described in greater detail below, the instant disclosure describes various systems and methods for authenticating applications installed on computing devices.

In one example, a method for authenticating applications installed on computing devices may include (i) requesting to download, onto an endpoint device, an application from a host server, (ii) receiving the application from the host server after the host server has (a) generated an authentication token to be used to authenticate the application on the endpoint device and (b) embedded the authentication token within a filename of the application, (iii) installing the application onto the endpoint device, (iv) identifying the authentication token within the filename of the application, and (v) using the authentication token to authenticate the endpoint device to the application such that a user of the endpoint device is provided access to the application.

In some examples, requesting to download the application may include (i) receiving, from the host server, the authentication token within a message that prompts the user of the endpoint device to request to download the application and (ii) sending, to the host server in response to the message, the authentication token within a request to download the application. In particular, the method may include receiving a uniform resource locator (URL) that directs the endpoint device to the host server and into which the host server has embedded the authentication token and then directing the endpoint device to the host server via the URL, where the host server identifies the authentication token within the URL.

In some embodiments, the host server may embed the authentication token within the filename of the application by identifying a filename format supported by an operating system of the endpoint device and then configuring the authentication token within the filename based on the supported filename format. In addition, the host server may embed the authentication token within a filename of an encrypted application package that contains the application without decrypting the application package.

In some examples, identifying the authentication token within the filename of the application may include identifying a filename of a most-recently downloaded file within a repository of downloaded files maintained by the endpoint. Additionally or alternatively, an authentication agent within the application may identify the authentication token within the filename in response to the application launching on the endpoint device. In some embodiments, the authentication agent may authenticate the endpoint device to the application based on the authentication token identified within the filename, rather than based on authentication credentials provided by the user of the endpoint device.

In some examples, authenticating the endpoint device to the application may enable the application to communicate securely with the host server from the endpoint device. Additionally or alternatively, authenticating the endpoint device may include registering an account of the user with the application.

In one embodiment, a system for authenticating applications installed on computing devices may include several modules stored in memory, including (i) a request module that requests to download, onto an endpoint device, an application from a host server, (ii) a reception module that receives the application from the host server after the host server has (a) generated an authentication token to be used to authenticate the application on the endpoint device and (b) embedded the authentication token within a filename of the application, (iii) an installation module that installs the application onto the endpoint device, (iv) an identification module that identifies the authentication token within the filename of the application, and (v) an authentication module that uses the authentication token to authenticate the endpoint device to the application such that a user of the endpoint device is provided access to the application. The system may also include at least one physical processor configured to execute the request module, the reception module, the installation module, the identification module, and the authentication module.

In some examples, the above-described method may be encoded as computer-readable instructions on a non-transitory computer-readable medium. For example, a computer-readable medium may include one or more computer-executable instructions that, when executed by at least one processor of an endpoint device, may cause the endpoint device to (i) request to download, onto the endpoint device, an application from a host server, (ii) receive the application from the host server after the host server has (a) generated an authentication token to be used to authenticate the application on the endpoint device and (b) embedded the authentication token within a filename of the application, (iii) install the application onto the endpoint device, (iv) identify the authentication token within the filename of the application, and (v) use the authentication token to authenticate the endpoint device to the application such that a user of the endpoint device is provided access to the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
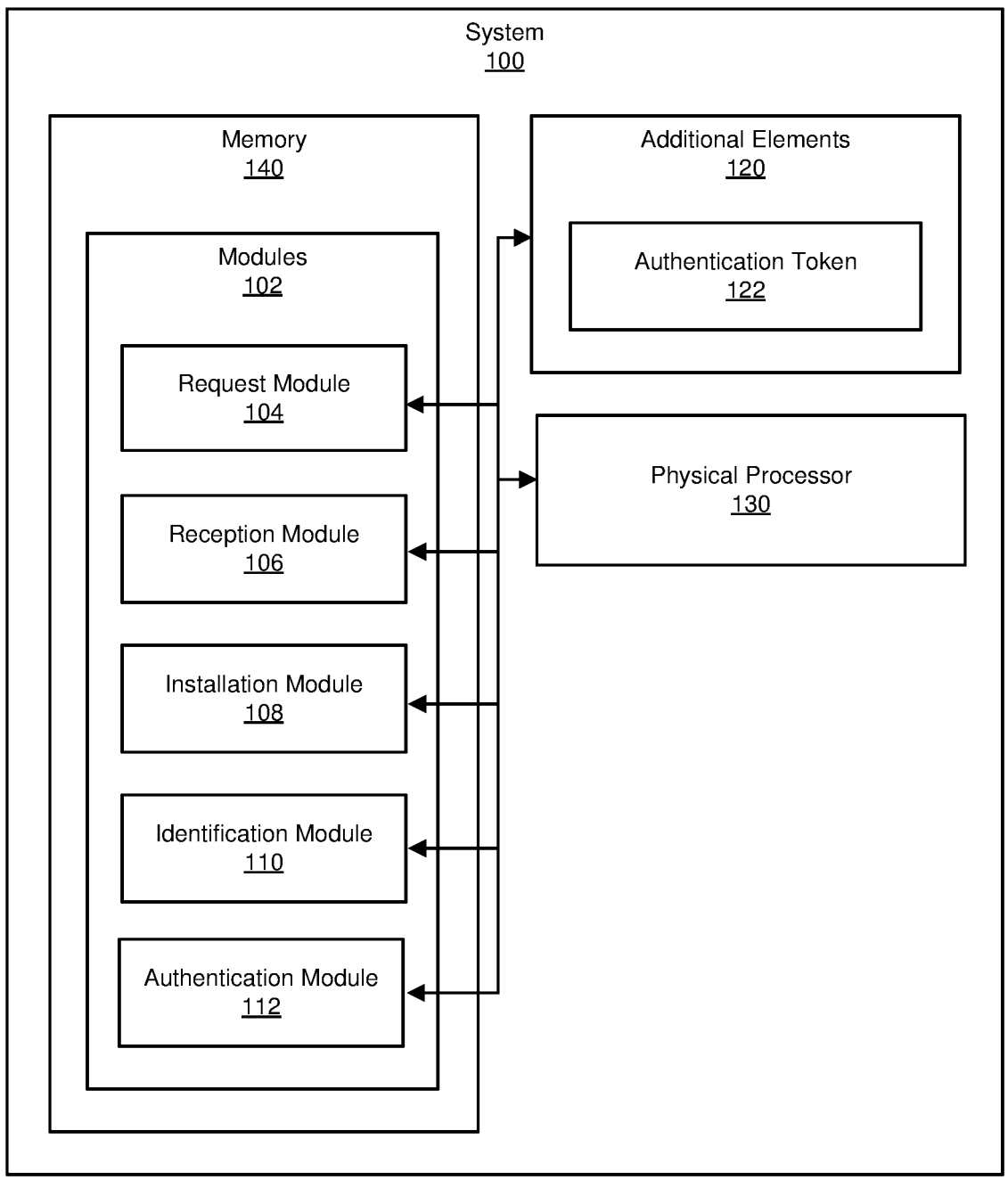
FIG. 1 is a block diagram of an example system for authenticating applications installed on computing devices.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for authenticating applications installed on computing devices. As will be explained in greater detail below, by inserting an authentication token into a filename of an application to be installed on a computing device, the disclosed systems and methods may facilitate efficient and seamless authentication of the computing device to the application. For example, the systems and methods described herein may enroll or register a user with an account managed by an application based on an authentication token within a filename of the application, thereby eliminating the need for the user to manually enter long or cumbersome authentication credentials.

In addition, the disclosed systems and methods may improve the functioning of a computing device by quickly and securely providing a user access to applications installed on the computing device. These systems and methods may also improve the field of user-authentication by providing fast, automatic authentication schemes that do not require modification of an encrypted application package.

Figure 2:
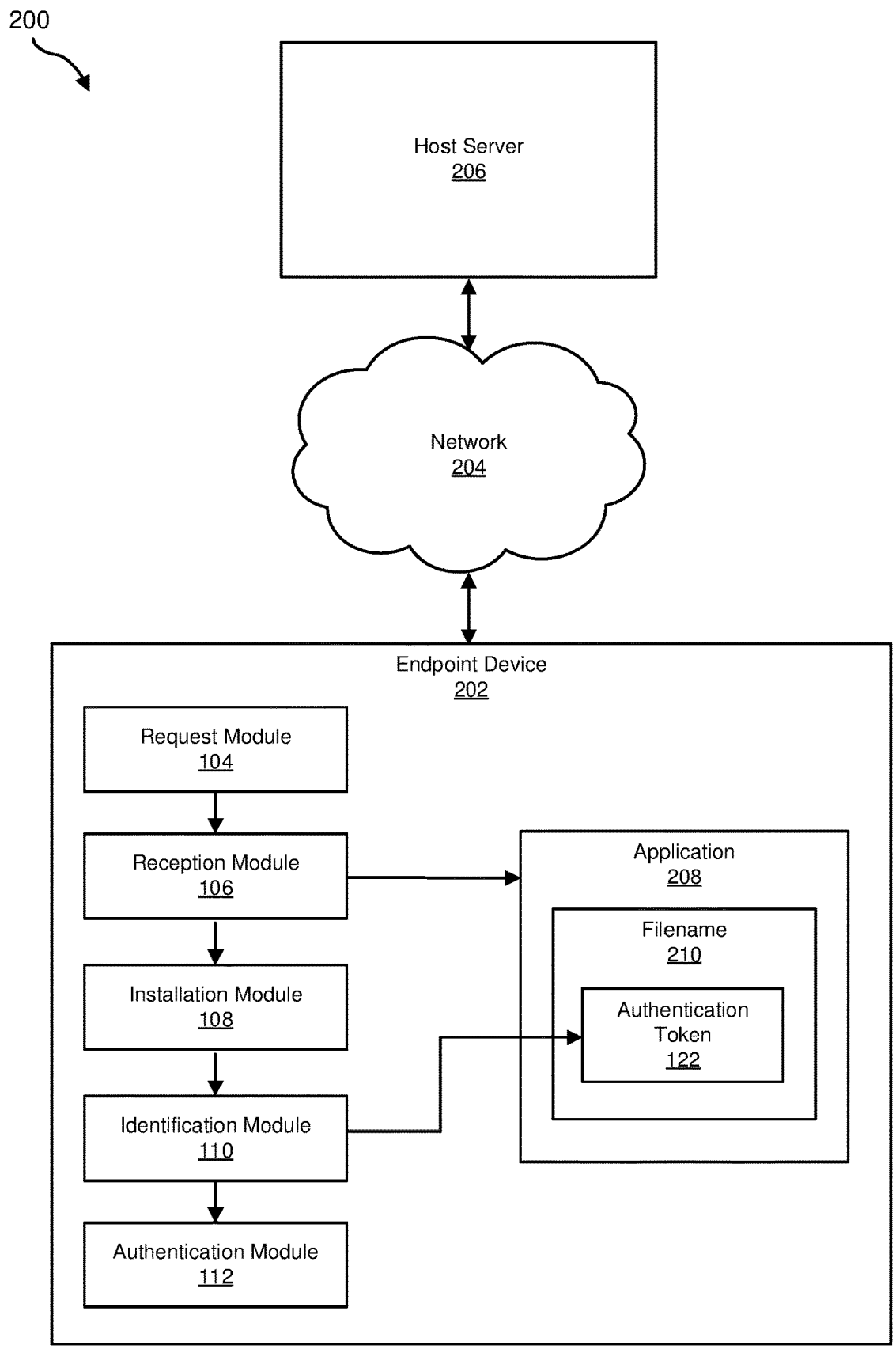
FIG. 2 is a block diagram of an additional example system for authenticating applications installed on computing devices.

The following will provide, with reference to FIGS. 1 and 2, detailed descriptions of example systems for authenticating applications installed on computing devices. Detailed descriptions of corresponding computer-implemented methods will also be provided in connection with FIGS. 3 and 5. In addition, detailed descriptions of example authentication tokens embedded within filenames of applications will be provided in connection with FIG. 4. Finally, detailed descriptions of an example computing system and network architecture capable of implementing one or more of the embodiments described herein will be provided in connection with FIGS. 6 and 7, respectively.

FIG. 1 is a block diagram of an example system 100 for authenticating applications installed on computing devices. As illustrated in this figure, example system 100 may include one or more modules 102 for performing one or more tasks. As will be explained in greater detail below, modules 102 may include a request module 104, a reception module 106, an installation module 108, an identification module 110, and an authentication module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., endpoint device 202 and/or host server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate authenticating applications installed on computing devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more authentication tokens, such as an authentication token 120. Authentication token 120 generally represents any type or form of key, code, string, binary sequence, or other portion of data that may be used to verify the identity of a user or computing device. For example, authentication token 120 may represent any information that, when provided to an application, authenticates a user of the application and/or a computing device on which the application is running.

Example system 100 in FIG. 1 may be implemented in a variety of ways. For example, all or a portion of example system 100 may represent portions of example system 200 in FIG. 2. As shown in FIG. 2, system 200 may include an endpoint device 202 in communication with a host server 206 via a network 204. In one example, all or a portion of the functionality of modules 102 may be performed by endpoint device 202, host server 206, and/or any other suitable computing system. As will be described in greater detail below, one or more of modules 102 from FIG. 1 may, when executed by at least one processor of endpoint device 202 and/or host server 206, enable endpoint device 202 and/or host server 206 to authenticate applications installed on computing devices.

For example, and as will be described in greater detail below, request module 104 may cause endpoint device 202 to request to download, onto endpoint device 202, an application 208 from host server 206. Reception module 106 may then cause endpoint device 202 to receive application 208 from host server 206 after host server 206 has (i) generated authentication token 120 to be used to authenticate application 208 on endpoint device 202 and (ii) embedded authentication token 120 within a filename 210 of application 208. Next, installation module 108 may cause endpoint device 202 to install application 208 onto endpoint device 202. In addition, identification module 110 may cause endpoint device 202 to identify authentication token 120 within filename 210 of application 208. Finally, authentication module 112 may cause endpoint device 202 to use authentication token 120 to authenticate endpoint device 202 to application 208 such that a user of endpoint device 202 is provided access to application 208.

Endpoint device 202 generally represents any type or form of computing device capable of reading computer-executable instructions. In one example, endpoint device 202 may represent an endpoint device managed by an organization that wishes to disseminate or push applications to one or more endpoint devices within the organization. Additional examples of endpoint device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Host server 206 generally represents any type or form of computing device that is capable of hosting and providing applications to be downloaded onto endpoint devices. In one example, host server 206 may represent a backend application-hosting server that generates authentication tokens for applications and embeds the authentication tokens into filenames of the applications. Additional examples of host server 206 include, without limitation, security servers, web servers, storage servers, and/or database servers configured to run certain software applications and/or provide various security, web, storage, and/or database services. Although illustrated as a single entity in FIG. 2, host server 206 may include and/or represent a plurality of servers that work and/or operate in conjunction with one another.

Network 204 generally represents any medium or architecture capable of facilitating communication or data transfer. In one example, network 204 may facilitate communication between endpoint device 202 and host server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
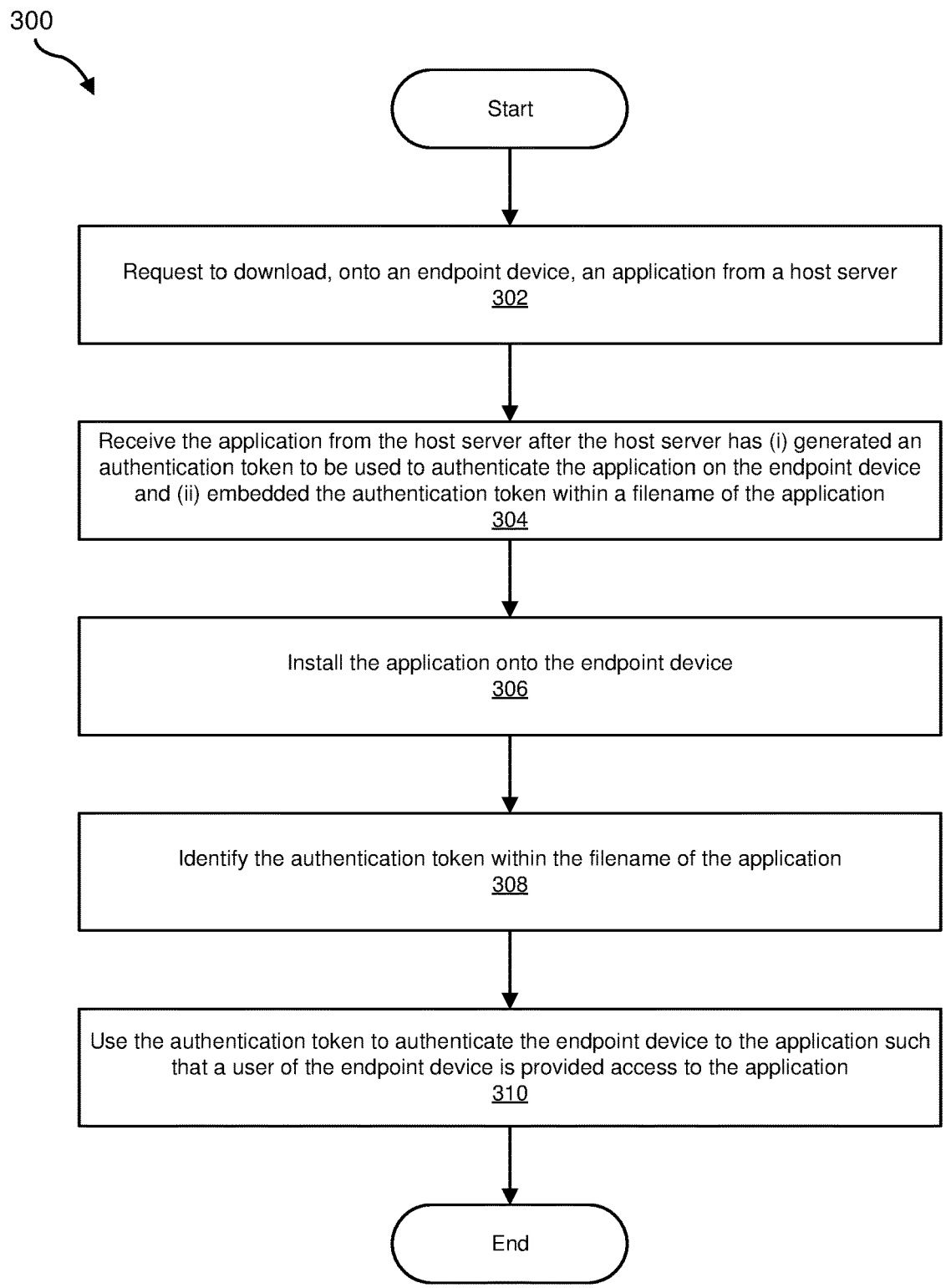
FIG. 3 is a flow diagram of an example method for authenticating applications installed on computing devices.

FIG. 3 is a flow diagram of an example computer-implemented method 300 for authenticating applications installed on computing devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may request to download, onto an endpoint device, an application from a host server. For example, request module 104 may, as part of endpoint device 202 in FIG. 2, request to download application 208 from host server 206.

The term "application," as used herein, generally refers to any type or form of program, file, software, and/or portion of executable code designed to perform one or more tasks on a computing device. Examples of applications include, without limitation, mobile applications, desktop applications, cloud-based applications, applications hosted on and distributed via cloud-based platforms, combinations of one or more of the same, and/or variations of one or more of the same.

In some embodiments, a user or endpoint device may be requested or required to authenticate themselves during the process of installing or setting up an application. For example, to protect the integrity of data stored within an application, the application may prompt a user to enroll or register an account managed by the application. Additionally or alternatively, an administrator or organization that manages an application may require users to authenticate themselves in order to control and/or track access to instances of the application across a group of computing devices. In some examples, an organization may wish to provide a particular application to all or a portion of the individuals or endpoint devices within the organization. For example, an Information Technology (IT) administrator may request that all users within an organization install a particular security application onto their devices. In another example, a manager may request that employees within a certain department install a work-related application onto their devices. As will be explained in greater detail below, administrators and/or organizations may utilize the disclosed systems to provide efficient authentication schemes that enable users to automatically install and authenticate applications on their endpoint devices.

The systems described herein may request to download an application in a variety of ways. In some examples, request module 104 may request to receive a copy of an application from a platform (e.g., a host server) that provides instances of the application to endpoint devices. In one embodiment, request module 104 may send such a request by directly accessing a platform that provides an application (e.g., by navigating to an application download platform and then selecting a link or clickable button that initiates downloading the application). In other embodiments, request module 104 may request to download an application by contacting and/or messaging a platform that hosts the application for download.

In some examples, request module 104 may request to download an application in response to being prompted to do so. For example, an administrator of an organization may prompt one or more users or endpoint devices within the organization to download and install a particular application. The administrator may prompt users in a variety of ways, such as by directly sending the users a copy of the application to be downloaded or by directing the users to access a platform that hosts the application for download. In one embodiment, request module 104 may determine that a user receives a message (e.g., an email or Short Message Service (SMS) message) that contains a hyperlink or a URL that directs the user's endpoint device to a host server that hosts an application to be downloaded. In this embodiment, request module 104 may follow the link or URL (or direct the user to do so). Such an action may indicate, to the host server, a request to download the application onto the endpoint device.

In some examples, request module 104 may send a request to download an application using an authentication token. The term "authentication token," as used herein, generally refers to any type or form of key, code, string, or other portion of data that may be used to verify the identity of a user or computing device. In some examples, an authentication token may contain or represent authentication credentials associated with a user or endpoint device. For example, an authentication token may contain an encoded and/or encrypted version of a username or password that was previously generated by a user. In other examples, an authentication token may contain a random number or string of characters.

The disclosed systems may generate random authentication tokens using any type or form of random-number or random-text generation algorithm, and the generated authentication tokens may be of any length or format. In addition, such authentication tokens may be generated for and/or assigned to a particular endpoint device or user, or may be used to authenticate multiple endpoint devices or users. Furthermore, in some examples, the disclosed systems may generate authentication tokens that are valid only for a predetermined amount of time (e.g., one hour, two days, etc.). In this way, unauthorized entities may be prevented from downloading applications intended for particular users or endpoint devices.

Request module 104 may send a request to download an application that contains an authentication token in a variety of ways. In one example, request module 104 may provide or enter an authentication token directly to a host server or other platform that hosts an application for download. In this example, the authentication token may represent authentication credentials that are known to and/or generated by a user of the endpoint device onto which the application will be installed. In other examples, request module 104 may receive an authentication token from a host server that hosts an application for download and then return the authentication token to the host server within a request to receive the application. For example, the host server may generate the authentication token and then send the authentication token to the endpoint device in a message that prompts request module 104 to request a copy of the application. When the host server receives the authentication token within a request to download the application from request module 104, the host server may validate the authentication token and determine that the request came from an authorized user and/or endpoint device that was directed to download the application.

As an example, the disclosed systems (operating within a host server) may embed or incorporate an authentication token within a URL that directs an endpoint device to the host server. For example, the host server may send, to request module 104, a URL such as "www.Application-DownloadPlatform.com/123456." In this example, "ApplicationDownloadPlatform" may represent the domain name of the host server and "123456" may represent the authentication token. Following this URL may initiate a call to the host server that includes the authentication token, which may enable the host server to identify and validate the authentication token.

Returning to FIG. 3, at step 304 one or more of the systems described herein may receive the application from the host server after the host sever has (i) generated an authentication token to be used to authenticate the application on the endpoint device and (ii) embedded the authentication token within a filename of the application. For example, reception module 106 may, as part of endpoint device 202 in FIG. 2, receive application 208 from host server 206 after host server 206 has generated authentication token 120 and embedded authentication token 120 within filename 210 of application 208.

A host server may generate an authentication token in a variety of ways. In some examples, the disclosed systems, operating within a host server, may generate an authentication token in response to a request to download an application. The host server may then associate the authentication token with a user and/or endpoint device that distributed the request. Alternatively, the disclosed systems may identify a previously-generated authentication token associated with a user or endpoint device in response to a request to download an application. For example, a host server may maintain a database of authentication tokens associated with various users and identify a token associated with a particular user in response to a request from the user to download an application.

In further examples, the disclosed systems may generate or identify an authentication token prior to receiving a request from request module 104 to download an application. For example, as discussed above in connection with step 302, a host server may generate an authentication token to be used by an endpoint device to gain access to an application, send the authentication token to the endpoint device within a prompt to request to download the application, and then receive the authentication token from the endpoint device within a request to download the application.

After identifying or generating an authentication token to be used to authenticate an endpoint device to an application, the disclosed systems may embed the authentication token within a filename of the application. The authentication token may represent all or a portion of the filename (excluding the filename extension). As an example, a host server may generate a filename such as "AuthToken1234.apk," where "AuthToken1234" represents an authentication token. In another example, a host server may include additional characters alongside an authentication token within a filename. For example, a host server may identify or delimit an authentication token within a filename by surrounding the authentication token with one or more characters (e.g., slashes, underscores, asterisks, or other special characters) that indicate the beginning and/or end of an authentication token. As an example, a host server may generate a filename such as "AuthToken_1234_.apk," where "1234" represents an authentication token.

In some embodiments, the disclosed systems may embed an authentication token within a filename based on a filename format supported by an operating system of the endpoint device onto which the application is to be installed. For example, various operating systems (e.g., LINUX operating systems, WINDOWS operating systems, MACINTOSH operating systems, etc.) may be configured to accept, handle, or support filenames with predetermined numbers of characters and/or predetermined character formats. As an example, one operating system may support filenames with up to 127 characters and may allow the use of special characters (e.g., asterisks, ampersands, etc.), while another operating system may support filenames with up to 255 characters and may not allow the use of special characters. Accordingly, the disclosed systems may identify a filename format supported by an endpoint device and configure the filename of an application such that the endpoint device is capable of downloading and installing the application.

Similarly, in some embodiments, the disclosed systems may encode an authentication token to transform the authentication token into a format supported by an endpoint device. For example, in the event that an authentication token is composed of a binary sequence, a host server may apply a base64 or other encoding scheme to the authentication token to convert the authentication token into a string of text before embedding the authentication token within a filename. Additionally or alternatively, the disclosed systems may encrypt an authentication token to prevent unauthorized users or endpoint devices from accessing, installing, and/or authenticating an application.

Notably, the disclosed systems may embed an authentication token into a filename of an application without modifying or altering contents of the application. For example, an application to be distributed to an endpoint device may have been encrypted by an administrator or developer of the application to prevent unauthorized modification of data within the application. Traditional systems for inserting authentication tokens into applications may involve decrypting encrypted application packages, which may be impractical and/or costly when distributing applications to large numbers of endpoint devices. By inserting authentication tokens into filenames of applications, the disclosed systems may eliminate the need to decrypt or modify a securely encrypted application.

After embedding an authentication token within a filename of an application, a host server may distribute the application to an endpoint device. The disclosed systems may send an application to an endpoint device in a variety of ways, such as by attaching the application to a message distributed directly to the endpoint device or by directing the endpoint device to a web address or server that hosts the application. Reception module 106, operating within an endpoint device that requested to download the application, may then receive, identify, and/or navigate to the application.

Returning to FIG. 3, at step 306 one or more of the systems described herein may install the application onto the endpoint device. For example, installation module 108 may, as part of endpoint device 202 in FIG. 2, install application 208 onto endpoint device 202.

The disclosed systems may install an application onto an endpoint device in a variety of ways. In some examples, installation module 108 may begin the process of installing an application by downloading the application onto a computing device after the application has been received from a host server. In one embodiment, a downloaded application may reside in a temporary storage location and/or repository of downloaded files on a computing device (e.g., a downloads folder). After an application has been downloaded onto a computing device, installation module 108 may direct an installation process to run on the computing device. This installation process may move or copy the application into a permanent storage location within the computing device such that an operating system of the computing device may access and/or execute the application. In some examples, installation module 108 may determine that an application has been encrypted (e.g., with a private encryption key associated with a developer of the application) and therefore decrypt the application (e.g., using a corresponding public encryption key) prior to installing the application.

Returning to FIG. 3, at step 308 one or more of the systems described herein may identify the authentication token within the filename of the application. For example, identification module 110 may, as part of endpoint device 202 in FIG. 2, identify authentication token 120 within filename 210 of application 208.

The systems described herein may identify an authentication token within a filename of an application in a variety of ways. In some examples, identification module 110 may begin the process of identifying an authentication token associated with an application by identifying the application's filename after the application has been downloaded and/or installed onto an endpoint device. Specifically, identification module 110 may identify an application's filename in response to the application opening, launching, or executing on an endpoint device. In one embodiment, identification module 110 may perform this identification while operating as part of an authentication agent contained within an application. For example, a host server may include, within an application to be sent to an endpoint device, an agent (e.g., a module or portion of executable code) dedicated to identifying authentication tokens associated with the application. This agent may include all or a portion of identification module 110.

Identification module 110 (e.g., as part of an authentication agent within an application) may search for a filename of an application in various locations within an endpoint device. In some examples, identification module 110 may search for an application's filename based on the platform and/or the operating system of the endpoint device on which the application is installed. For example, a WINDOWS operating system may indicate an application's filename within a header or portion of metadata stored at the location of the installed application. Accordingly, identification module 110 may identify filenames of applications installed on WINDOWS devices by directly accessing or querying this data. However, an ANDROID operating system may prevent such a direct identification. As such, identification module 110 may identify a filename of an application installed on an ANDROID device in an alternative manner, such as by identifying a filename of a most-recently downloaded application within a repository of downloaded files maintained by the device.

After identifying a filename of an application received from a host server and installed on an endpoint device, identification module 110 may parse, analyze, or search the filename to identify an authentication token embedded within the filename. As discussed above in connection with step 304, a host server may embed an authentication token within a filename of an application based on a filename format supported by an endpoint device onto which the application is to be installed. Accordingly, identification module 110 may extract an authentication token from a filename based on the filename's format. For example, identification module 110 may search for an authentication token within a filename based on a number and/or type of characters generally included within filenames of the same format. Additionally or alternatively, identification module 110 may identify an authentication token within a filename based on delimiting characters inserted into the filename by the host server that generated the filename.

In some examples, identification module 110 may determine that an authentication token has been encoded or encrypted prior to being embedded within a filename. In these examples, identification module 110 may perform any appropriate decoding and/or decrypting procedure to restore or generate the original version of the authentication token. As an example, in the event that an authentication token is composed of a binary sequence and was encoded into a string of text using a base64 encoding scheme, identification module 110 may decode the string of text using a corresponding base64 decoding scheme. In another example, in the event that an authentication token was encrypted using a private encryption key, identification module 110 may decrypt the authentication token using a corresponding public encryption key.

Figure 4:
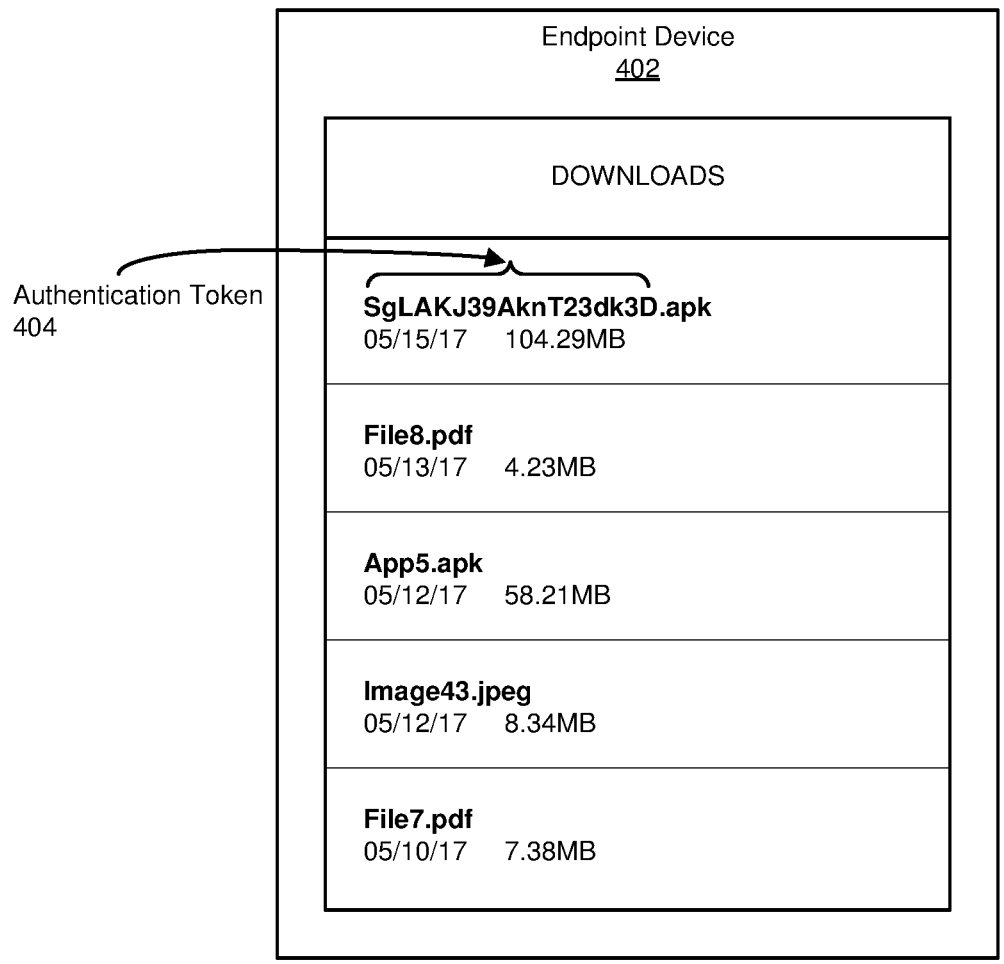
FIG. 4 is an illustration of an example authentication token embedded within a filename of an application.

FIG. 4 illustrates an example of identifying an authentication token within a filename of an application. In this example, identification module 110 may identify an authentication token 404 within a downloads folder maintained by an endpoint device 402. In particular, identification module 110 may, as part of an authentication agent contained within an application downloaded onto endpoint device 402, access the downloads folder in response to the application launching on endpoint device 402. Identification module 110 may then identify the filename of the application by identifying the most-recently downloaded file within the downloads folder (i.e., the application package downloaded on May 15, 2017) based on the download dates associated with the files listed in the downloads folder. Finally, identification module 110 may extract authentication token 404 (i.e., "SgLAKJ39AknT23dk3D") from within the filename.

Returning to FIG. 3, at step 310 one or more of the systems described herein may use the authentication token to authenticate the endpoint device to the application such that a user of the endpoint device is provided access to the application. For example, authentication module 112 may, as part of endpoint device 202 in FIG. 2, use authentication token 120 to authenticate endpoint device 202 to application 208 such that a user of endpoint device 202 is provided access to application 208.

The systems described herein may use an authentication token to authenticate an endpoint device to an application in a variety of ways. In some examples, authentication module 112 may provide an identified authentication token to an application installed on a computing device to enable a user of the computing device to access the application. For example, authentication module 112 may use an authentication token to enroll or register a user and/or endpoint device with the application. In other words, providing an authentication token to an application may assert, to the application, that a user of an endpoint device on which the application is installed is authorized to access the application.

In some embodiments, authentication module 112 may use an identified authentication token to initiate an authentication flow or process with a host server. For example, authentication module 112 may provide an authentication token to a host server and the host server may provide, in response, a long live authentication token, an endpoint device identifier, and/or any additional type of authentication information. Authentication module 112 may use such information to grant permission to a user to access an application, to maintain secure communication with the host server, and/or in any suitable manner.

In some examples, all or a portion of authentication module 112 may be contained within an authentication agent within an application. In particular, authentication module 112 may operate within the same authentication agent in which identification module 110 may operate, as discussed above. In this way, authentication module 112 may efficiently and seamlessly facilitate authentication of an endpoint device to an application without requiring input from a user of the endpoint device, and also without input or participation from the endpoint device.

Figure 5:
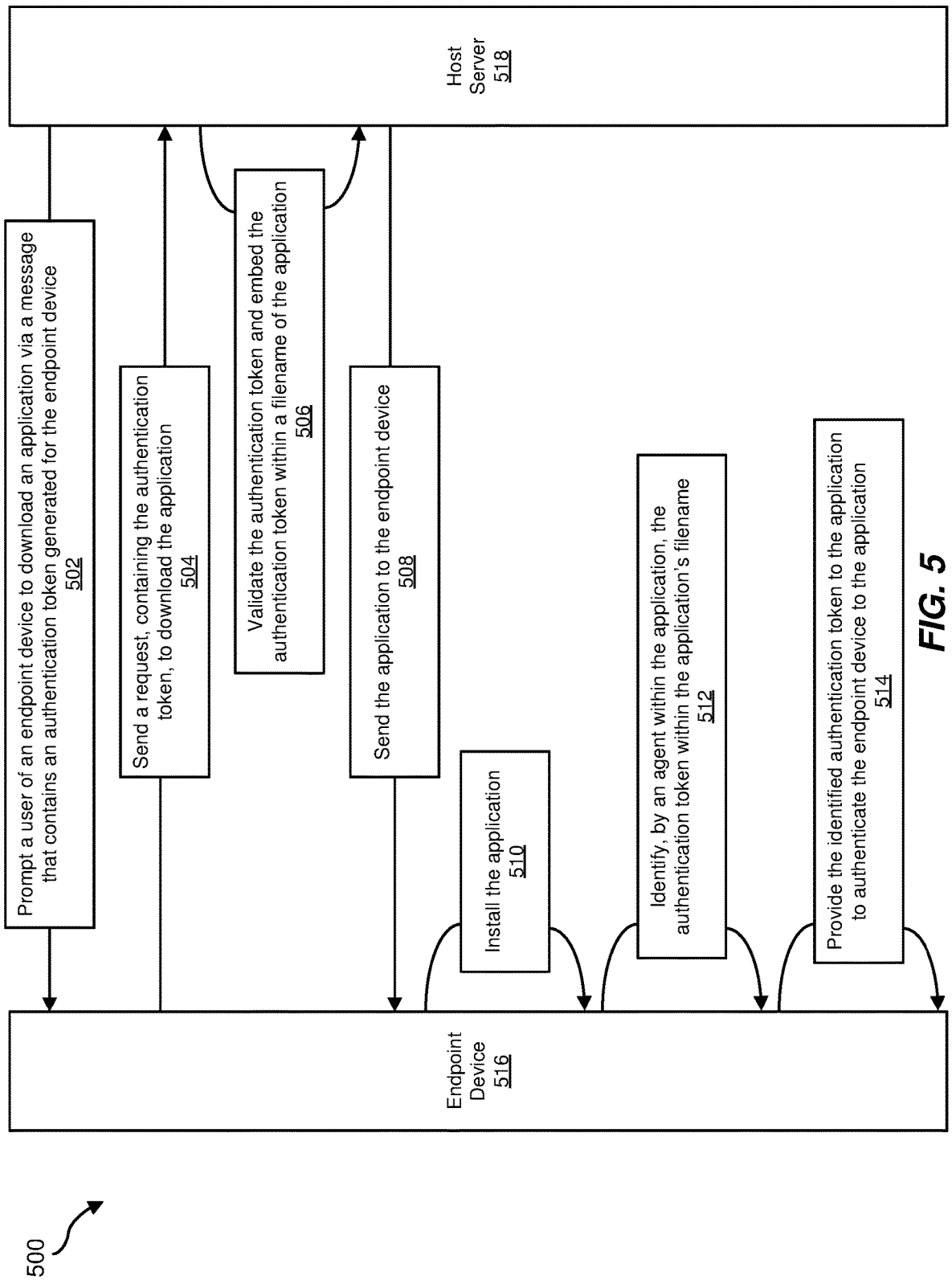
FIG. 5 is a block diagram of an additional example method for authenticating applications installed on computing devices.

FIG. 5 illustrates an example method of authenticating an endpoint device to an application. In particular, this example illustrates the process of providing an application from a host server 518 to an endpoint device 516 and then automatically authenticating endpoint device 516 to the application. As shown in FIG. 5, at step 502 host server 518 may prompt a user of endpoint device 516 to download an application via a message that contains an authentication token generated for the endpoint device. At step 504, endpoint device 516 may receive this message and then send a request, containing the authentication token, to download the application from host server 518. At step 506, host server 518 may receive this request and validate the authentication token within the request. Host server 518 may then embed the authentication token within a filename of the application. At step 508, host server 518 may send the application to endpoint device 516.

At step 510, endpoint device 516 may receive, download, and install the application with the filename containing the authentication token. Next, at step 512, an agent within the application may identify the authentication token within the application's filename. At step 514, the authentication agent may provide the identified authentication token to the application and/or to host server 518 to authenticate the endpoint device to the application. This authentication, performed without manual input from a user of endpoint device 516, may enable the user to access the application.

Figure 6:
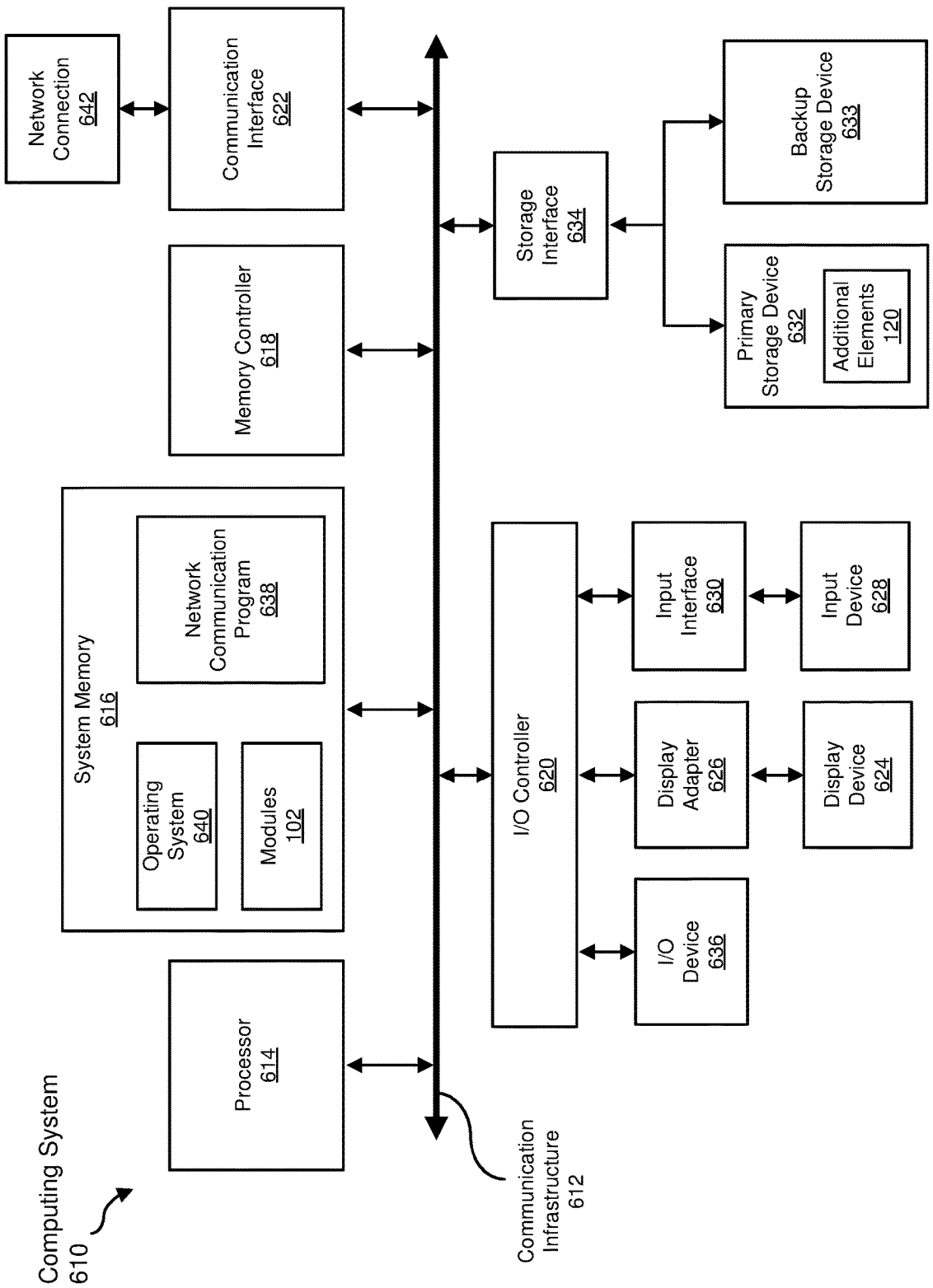
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, authentication token 120 rom FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
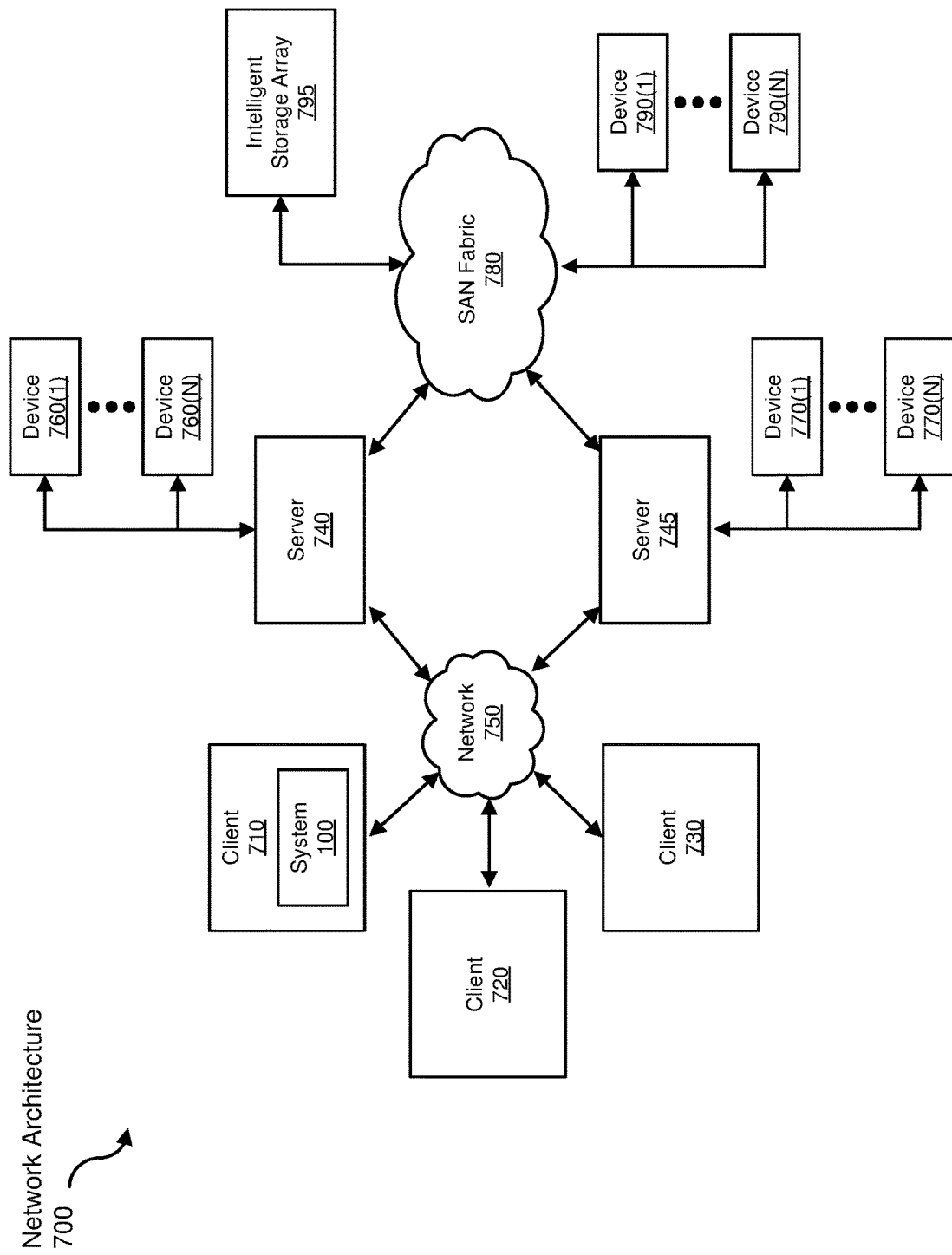
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for authenticating applications installed on computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a request to download an application to be transformed, transform the request into an application that contains an authentication token within the application's filename, output a result of the transformation to an endpoint device that requested to download the application, use the result of the transformation to facilitate automatic authentication of the application on the endpoint device based on the authentication token, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authenticating applications installed on computing devices, at least a portion of the method being performed by an endpoint device comprising at least one processor, the method comprising:
    requesting to download, onto the endpoint device, an application from a host server;
    receiving the application from the host server after the host server has:
        generated an authentication token to be used to authenticate the application on the endpoint device, and
        embedded the authentication token within a filename of the application;
    installing the application onto the endpoint device;
    identifying the authentication token within the filename of the application by:
        after the application is installed onto the endpoint device, identifying, by an authentication agent that is part of the application, a location within the endpoint device that stores the filename of the application; and
        extracting, by the authentication agent, the authentication token from the filename stored within the endpoint device; and
    using the authentication token to authenticate the endpoint device to the application such that a user of the endpoint device is provided access to the application.

2. The method of claim 1, wherein requesting to download the application comprises:
    receiving, from the host server, the authentication token within a message that prompts the user of the endpoint device to request to download the application; and
    sending, to the host server in response to the message, the authentication token within a request to download the application.

3. The method of claim 2, wherein:
    receiving the authentication token from the host server comprises receiving a uniform resource locator that directs the endpoint device to the host server and into which the host server has embedded the authentication token; and
    sending the request to download the application comprises directing the endpoint device to the host server via the uniform resource locator, where the host server identifies the authentication token within the uniform resource locator.

4. The method of claim 1, wherein the host server embeds the authentication token within the filename of the application by:
    identifying a filename format supported by an operating system of the endpoint device; and
    configuring the authentication token within the filename based on the supported filename format.

5. The method of claim 1, wherein:
the application is contained within an encrypted application package; and
the host server embeds the authentication token with a filename of the encrypted application package without decrypting the encrypted application package.

6. The method of claim 1, wherein the authentication agent identifies the location within the endpoint device that stores the filename of the application by identifying a repository of downloaded files maintained by the endpoint device.

7. The method of claim 1, wherein the authentication agent identifies the authentication token within the filename in response to the application launching on the endpoint device.

8. The method of claim 1, wherein authenticating the endpoint device to the application comprises at least one of:
enabling the application to communicate securely with the host server from the endpoint device; and
registering an account of the user with the application.

9. The method of claim 1, wherein the authentication agent identifies the location within the endpoint device that stores the filename of the application based at least in part on an operating system of the endpoint device.

10. The method of claim 1, wherein the authentication agent identifies the location within the endpoint device that stores the filename of the application by identifying a portion of metadata stored in connection with the installed application.

11. A system for authenticating applications installed on computing devices, the system comprising:
a request module, stored in memory, that requests to download, onto an endpoint device, an application from a host server;
a reception module, stored in memory, that receives the application from the host server after the host server has:
generated an authentication token to be used to authenticate the application on the endpoint device, and
embedded the authentication token within a filename of the application;
an installation module, stored in memory, that installs the application onto the endpoint device;
an identification module, stored in memory, that identifies the authentication token within the filename of the application by:
after the application is installed onto the endpoint device, identifying, as part of an authentication agent within the application, a location within the endpoint device that stores the filename of the application; and
extracting, as part of the authentication agent within the application, the authentication token from the filename stored within the endpoint device;
an authentication module, stored in memory, that uses the authentication token to authenticate the endpoint device to the application such that a user of the endpoint device is provided access to the application; and
at least one physical processor configured to execute the request module, the reception module, the installation module, the identification module, and the authentication module.

12. The system of claim 11, wherein the request module requests to download the application by:
receiving, from the host server, the authentication token within a message that prompts the user of the endpoint device to request to download the application; and
sending, to the host server in response to the message, the authentication token within a request to download the application.

13. The system of claim 12, wherein the request module:
receives the authentication token from the host server by receiving a uniform resource locator that directs the endpoint device to the host server and into which the host server has embedded the authentication token; and
sends the request to download the application by directing the endpoint device to the host server via the uniform resource locator, where the host server identifies the authentication token within the uniform resource locator.

14. The system of claim 11, wherein the host server embeds the authentication token within the filename of the application by:
identifying a filename format supported by an operating system of the endpoint device; and
configuring the authentication token within the filename based on the supported filename format.

15. The system of claim 11, wherein:
the application is contained within an encrypted application package; and
the host server embeds the authentication token with a filename of the encrypted application package without decrypting the encrypted application package.

16. The system of claim 11, wherein the identification module, as part of the authentication agent within the application, identifies the location within the endpoint device that stores the filename of the application by identifying a repository of downloaded files maintained by the endpoint device.

17. The system of claim 11, wherein the identification module, as part of the authentication agent within the application, identifies the authentication token within the filename in response to the application launching on the endpoint device.

18. The system of claim 11, wherein the authentication module authenticates the endpoint device to the application by at least one of:
enabling the application to communicate securely with the host server from the endpoint device; and
registering an account of the user with the application.

19. A non-transitory computer-readable medium comprising one or more computer-executable instructions that, when executed by at least one processor of an endpoint device, cause the endpoint device to:
request to download, onto the endpoint device, an application from a host server;
receive the application from the host server after the host server has:
generated an authentication token to be used to authenticate the application on the endpoint device, and
embedded the authentication token within a filename of the application;
install the application onto the endpoint device;
identify the authentication token within the filename of the application by:
after the application is installed onto the endpoint device, identifying, by an authentication agent that is part of the application, a location within the endpoint device that stores the filename of the application; and
extracting, by the authentication agent, the authentication token from the filename stored within the endpoint device; and use the authentication token to authenticate the endpoint device to the application such that a user of the endpoint device is provided access to the application.

20. The computer-readable medium of claim 19, wherein the one or more computer-executable instructions cause the endpoint device to request to download the application by:
receiving, from the host server, the authentication token within a message that prompts the user of the endpoint device to request to download the application; and
sending, to the host server in response to the message, the authentication token within a request to download the application.

\* \* \* \* \*